United States Patent
Fengel et al.

(10) Patent No.: US 7,431,367 B2
(45) Date of Patent: Oct. 7, 2008

(54) VIEW BLOCKING ELEMENT FOR A LUGGAGE COMPARTMENT OF A VEHICLE AS WELL AS TAILGATE HAVING SUCH A VIEW BLOCKING ELEMENT

(75) Inventors: Paul-Dieter Fengel, Eberdingen (DE); Roland Buehner, Fellbach-Schmiden (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 258 days.

(21) Appl. No.: 11/372,171

(22) Filed: Mar. 10, 2006

(65) Prior Publication Data

US 2006/0214452 A1 Sep. 28, 2006

(30) Foreign Application Priority Data

Mar. 11, 2005 (DE) .................. 10 2005 011 320

(51) Int. Cl.
*B60J 7/00* (2006.01)
*E04H 15/06* (2006.01)

(52) U.S. Cl. ............. 296/37.16; 135/88.09; 160/370.21

(58) Field of Classification Search ............. 296/37.16, 296/97.7, 97.8; 160/370.21, DIG. 2, DIG. 3; 138/88.09

See application file for complete search history.

(56) References Cited

U.S. PATENT DOCUMENTS

| | | | |
|---|---|---|---|
| 4,222,600 A | 9/1980 | Cripps et al. | |
| 4,836,263 A | 6/1989 | Ament | |
| 6,135,191 A | 10/2000 | Mitchell et al. | |
| 2002/0092553 A1 | 7/2002 | Chal et al. | |

FOREIGN PATENT DOCUMENTS

| | | |
|---|---|---|
| DE | 36 12 165 A1 | 10/1987 |
| DE | 199 02 205 A1 | 8/2000 |
| FR | 2 720 696 A3 | 12/1995 |
| FR | 2 749 878 A1 | 12/1997 |

OTHER PUBLICATIONS

European Search Report dated Mar. 7, 2006 including English Translation of relevant portion (Six (6) pages).
German Office Action dated Mar. 16, 2006 (Four (4) pages).
German Office Action dated Mar. 16, 2006 with English Translation (Eight (8) pages).

*Primary Examiner*—Joseph D Pape
(74) *Attorney, Agent, or Firm*—Crowell & Moring LLP

(57) ABSTRACT

A view blocking element for a vehicle luggage compartment for a vehicle luggage compartment has a carrier and a flexible flat structure held thereon in a mounted condition. The view blocking element is constructed such that the carrier has a base from which, at least by way of a first end, a spring arm of a tensioning device for the flat structure starts out. The spring arm is connected with the flat structure at a distance from the first end.

18 Claims, 4 Drawing Sheets

VIEW BLOCKING ELEMENT FOR A LUGGAGE COMPARTMENT OF A VEHICLE AS WELL AS TAILGATE HAVING SUCH A VIEW BLOCKING ELEMENT

BACKGROUND AND SUMMARY OF THE INVENTION

The present invention is based on a view blocking element for a luggage compartment of a vehicle and on a tailgate having such a view blocking element.

A known view blocking element is shown in DE 199 02 205 A1 and is used for at least partially covering a luggage compartment, also called a trunk, in a vehicle, particularly a motor vehicle. The view blocking element has a carrier which, according to a known construction, is implemented as a surrounding frame in which a flexible flat structure is held in a mounted manner, or which frame is covered with the flat structure. The flat structure is made of a textile material.

Furthermore, U.S. Pat. No. 4,222,600 A shows a view blocking element for a luggage compartment which is arranged on an interior side of a tailgate which can open up or close the luggage compartment. Here, the view blocking element is composed of rigid plate-shaped elements which are mutually connected by film hinges or the like, so that the view blocking element can be folded and unfolded.

An object of the present invention is to provide a weight-optimized view blocking element by way of a view blocking element in which the carrier comprises a base from which, at least by way of a first end, a spring arm of a tensioning device for the flat structure starts out, and in that the spring arm is connected with the flat structure at a distance from the first end, as well as way of a tailgate for a vehicle having such a view blocking element.

Among the principal advantages achieved with the invention are that weight is saved with respect to the view blocking element by a reduced use of material at the carrier for the flat structure because only a base is provided as the carrier, from which base at least one spring arm originates which holds the flat structure in a mounted position with respect to the base. A surrounding frame can therefore be eliminated in the case of the view blocking element according to the invention.

In addition, it is advantageous that damage to the view blocking element can be avoided in many cases when corresponding cargo is stored in the luggage compartment and, for example, the tailgate is closed because, when the view blocking element impacts on this object in the luggage compartment, the spring arm can yield in a resilient manner.

According to one embodiment of the present invention, if required, the flexible flat structure can advantageously be replaced during a repair.

For a simple construction of the releasable connection, an opening can be provided in the flat structure in which a projection, particularly a hook, engages which originates from the spring arm.

In addition, an exchange of the entire view blocking element or its removal is now made possible when correspondingly large pieces of luggage are to be transported in the luggage compartment.

A flat structure, which comprises a web of fabric, is particularly preferred with a view to a light-weight construction.

According to a further development of the present invention, a wide mounting of the flat structure is achieved, which can be further improved providing the hook opening is situated in a corner between the second long side and a narrow side of the flexible flat structure.

The surface structure can be fastened to the base in a particularly simple manner. Furthermore, large-surface mounting of the flat structure is achievable due to the fact the tensioning device has two spring arms which starting out from their first end at the base, extend away from one another.

An embodiment of a tailgate I which the view blocking element is fastened approximately in a transition section between the rear window and the flat frame section to the interior side of the tailgate is currently particularly preferable. The view blocking according to the invention provides a completely covered luggage space below the flat frame section of the tailgate, which luggage space cannot be viewed from the outside, thus also not by way of the rear window.

Other objects, advantages and novel features of the present invention will become apparent from the following detailed description of the invention when considered in conjunction with the accompanying drawings.

DETAILED DESCRIPTION OF THE DRAWINGS

Figure 1:
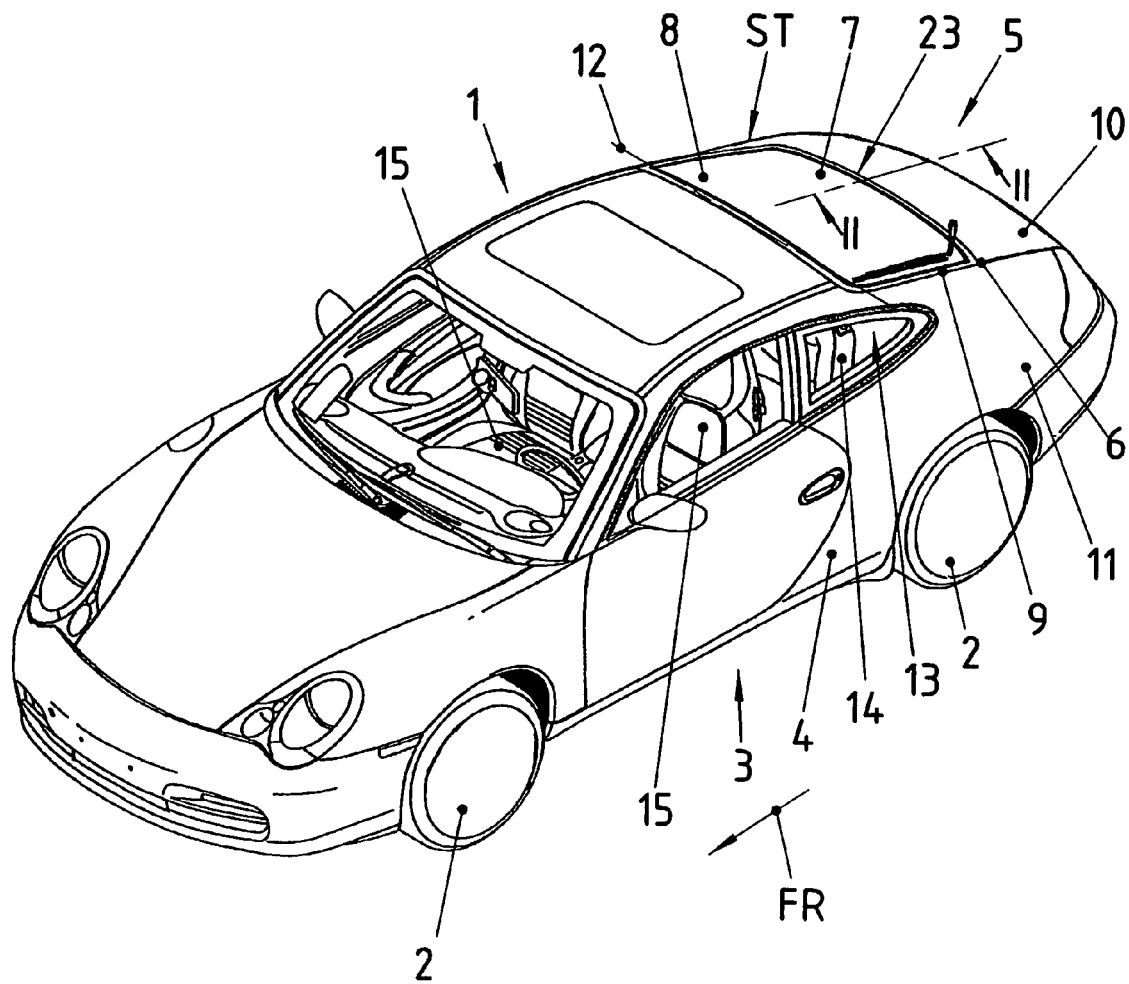
FIG. 1 is a perspective view of a vehicle having a tailgate.

FIG. 1 illustrates a vehicle 1, particularly a motor vehicle, comprising a body 3 which is carried by wheels 2 and has a body shell 4 having an opening 6 in the rear area 5, into which opening 6 a tailgate 7 is inserted. The tailgate 7 comprises a rear window 8 bordered by a frame 9. Viewed in the principal forward driving direction FR of the vehicle, the frame 9 has a flat frame section 10 situated behind the rear window 8, which frame section 10 is non-transparent and a component of the vehicle skin 11 of the body shell 4.

At its upper corners, the tailgate 7 is also linked to the body shell 4 about a swiveling axis 12 extending parallel to the transverse direction of the vehicle, so that it can be folded from the closed position ST illustrated in FIG. 1 into an upward-folded open position which is not shown here and in which it opens up a luggage compartment 13 situated inside the vehicle 1 behind the vehicle seats 14 and 15 respectively and is closed by the tailgate 7 in the closed position ST.

The vehicle 1 may be constructed as a motor vehicle with two or more seats. In the case of a preferred two-seater, the luggage compartment 13 is situated behind the driver seat and the passenger seat 15 respectively. However, in the illustrated embodiment, the vehicle has four seats with a rear row of seats which has at least the illustrated rear seat 14.

Figure 2:
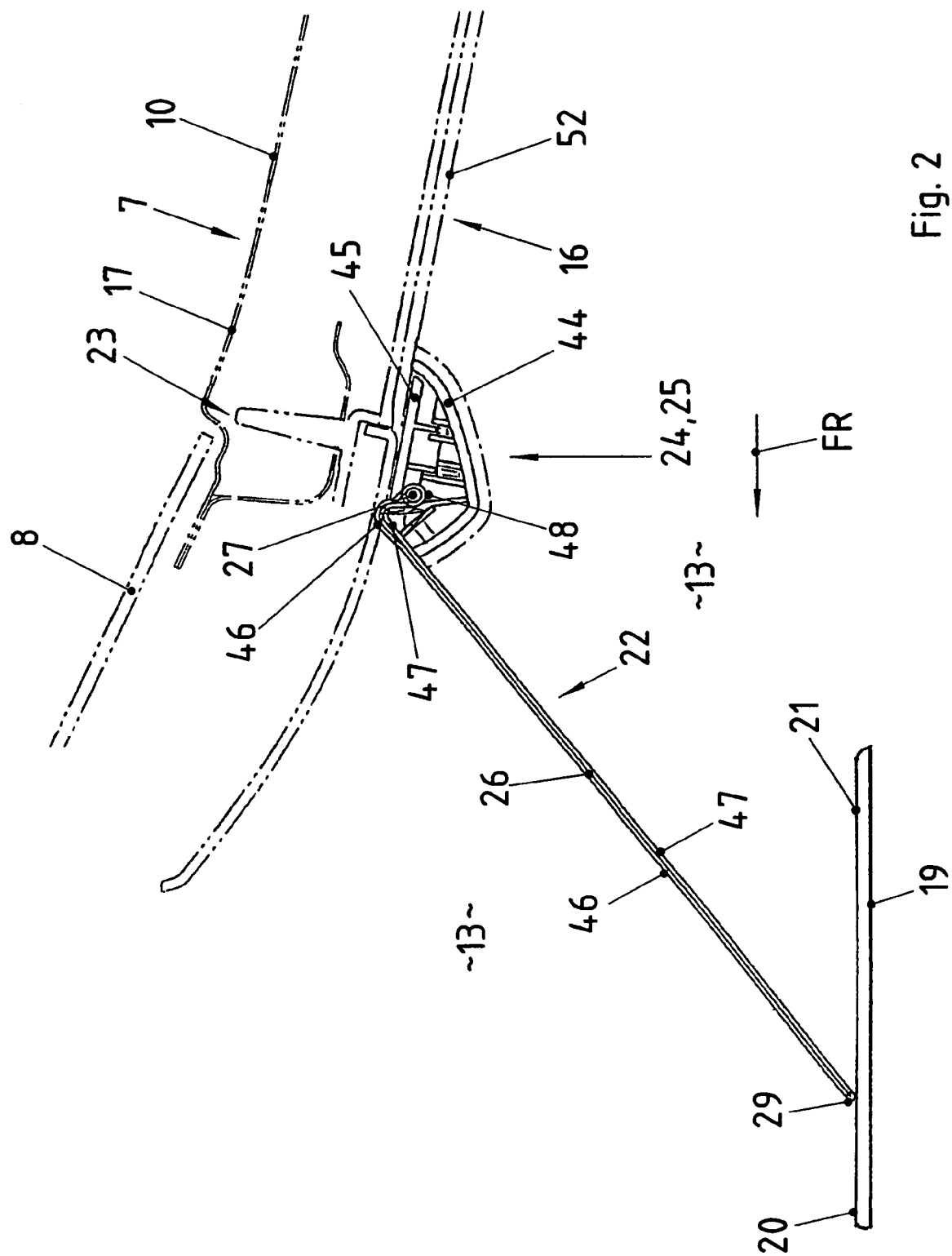
FIG. 2 is a sectional view of the tailgate along line II-II in FIG. 1.

According to the definition, an interior side 16 of the tailgate 7, which in addition has an exterior side 17 assigned to the skin 11, faces the luggage compartment 13. As seen partially shown in FIG. 2, the luggage compartment 13 has a luggage compartment floor 19 which extends from the seat 14 or 15 to under the flat frame section 10 of the tailgate 7. The luggage compartment floor 19 has a first section called a rear shelf 20. It also has a trunk floor 21 which—viewed in the driving direction FR—adjoins the rear shelf 20 behind this rear shelf 20. In FIG. 2, the rear shelf and the trunk floor 21 have a planar construction. However, the trunk floor 21 can also be situated at a lower level than the rear shelf 20 within contemplation of the present invention, so that a downward step (not shown), is situated between the rear self 20 and the trunk floor 21.

So that the partial area of the luggage compartment 13 situated below the flat frame section 10 cannot be viewed from the exterior side of the vehicle, particularly through the rear window 8, a view blocking element 22 is preferably releasably fastened to the interior side 16 of the tailgate 7. The view blocking element 22 extends, for example, diagonally between the interior side 16 and the luggage compartment floor 19. In particular, the view blocking element 22 is fastened to the interior side 16 in a transition section 23 of the tailgate 7 which is situated between the rear window 8 and the flat frame section 10 of the tailgate 7.

Figure 3:
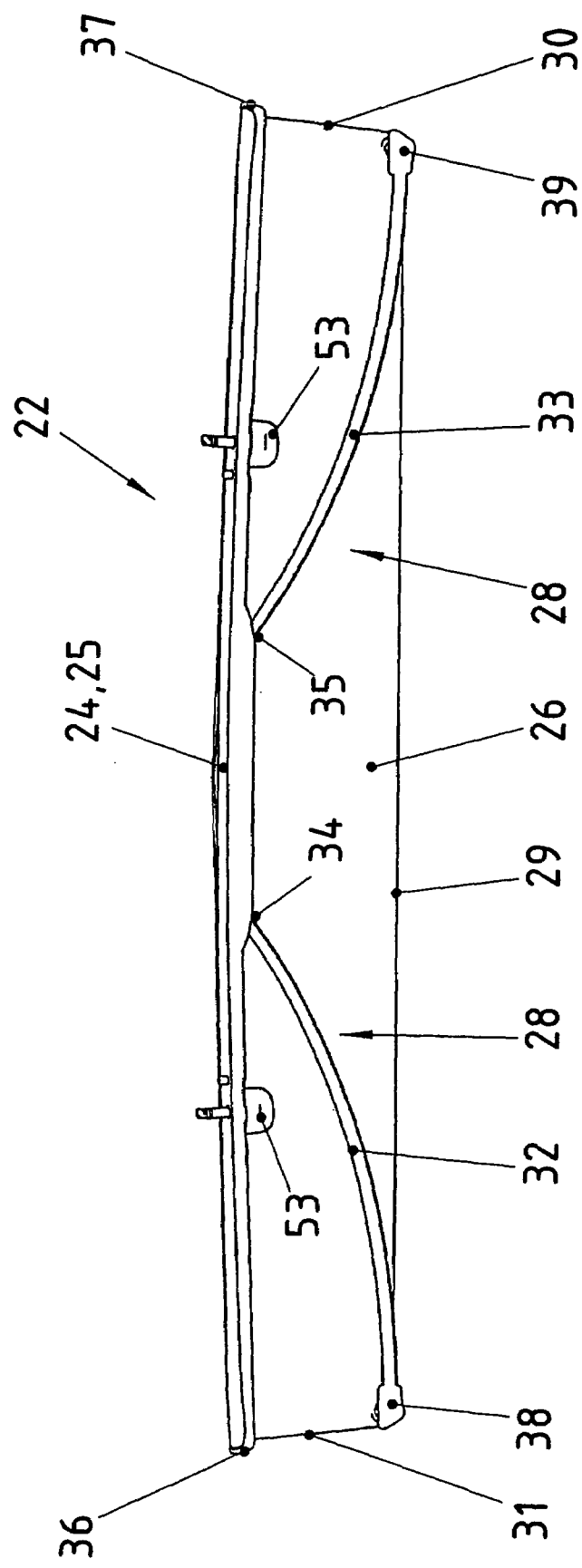
FIGS. 3 and 4 are different views of a view blocking element which can be fastened to the tailgate shown in FIG. 2.
Figure 4:
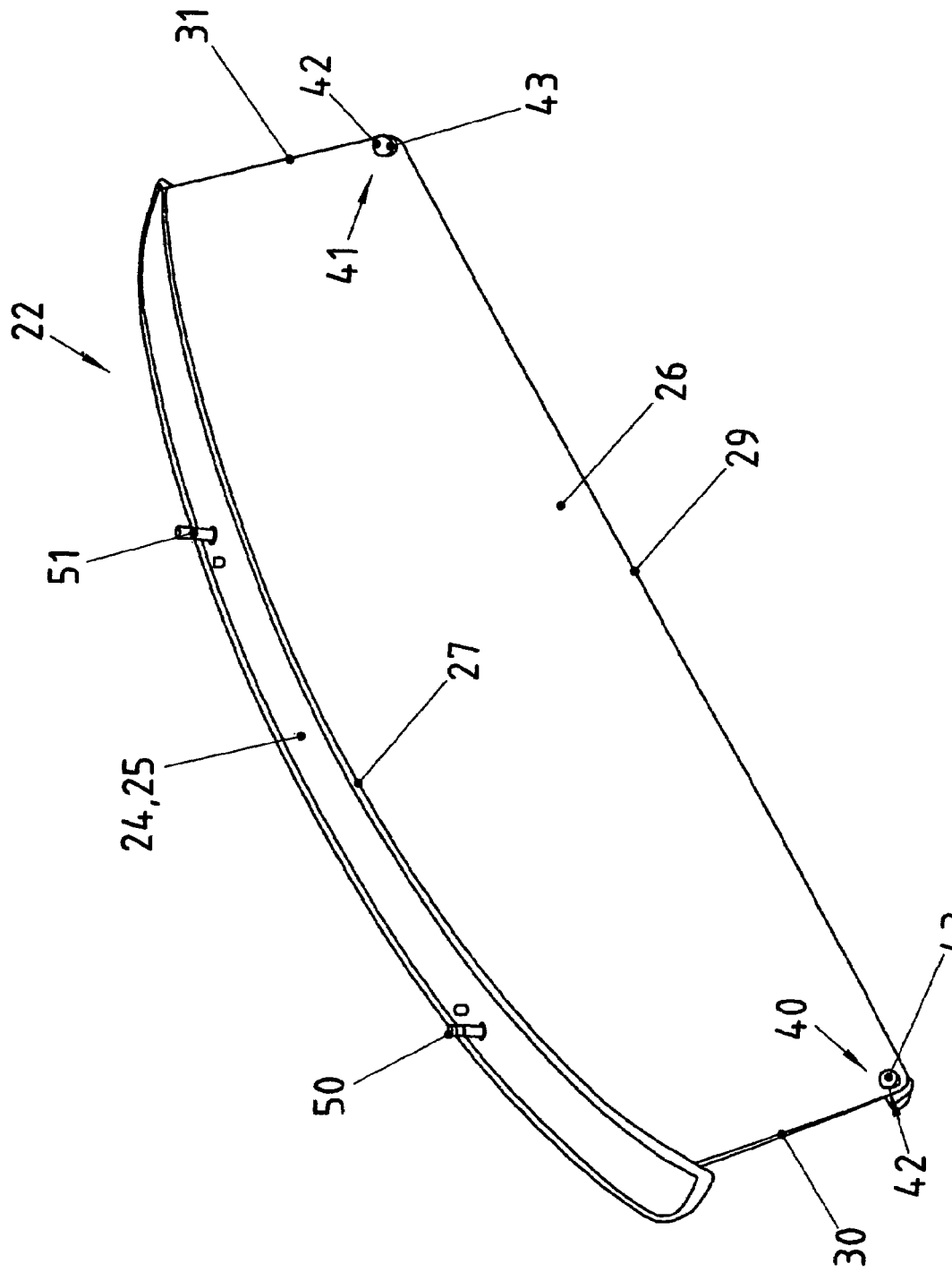

The view blocking element 22 will now be explained in the following by reference to FIGS. 2 to 4. The view blocking element 22 is composed of a carrier 24 which has a base 25 extending approximately parallel to the interior side 16. In addition, a flexible flat structure 26 is held on the carrier 24 in a mounted fashion. The flat structure 26 is constructed, for example, as a web of fabric. The flat structure 26 can be held in a mounted fashion with respect to the carrier 24 by being fastened on the base 25 with a first long side 27 and tensioned by a tensioning device 38 mounted on the base 25 with its second long side 29 with respect to the base 25. In addition, the flat structure 26 has two narrow sides 30, 31 so that it is implemented, for example, in a strip-shaped form. The view blocking element 22 with the flat structure 26 extends over the width of the luggage compartment 13.

The tensioning device 28 comprises at least one, for example, curved spring arm 32 which starts out from the base 25, preferably approximately in the center. In the illustrated embodiment, two spring arms 32, 33 are provided. Starting out from their respective first end 34, 35 respectively mounted on the base 25, the spring arms extend at an angle in the direction of the mutually opposite ends 36, 37 respectively of the base 25. That is, starting from their respective end 34, 35, they extend away from one another. The spring arms 32, 33 may be prestressed particularly in the direction away from the base 25, so that they apply a spring force or tensioning force to the flat structure 26 which extends approximately parallel to the narrow sides 30, 31 respectively. For this purpose, the spring arms are connected with the flat structure 26 at a distance from their first end 34, 35 respectively. This connection preferably takes place at the second end 38, 39 of the respective spring arm 32 and 33 respectively.

The connection between the spring arm 32, 33 respectively and the flat structure 26 can be released, for the purpose of which, particularly in a corner area 40, 41 respectively situated between the respective narrow side 30, 31 respectively and the second long side 29, the flat structure 26 in each case has an opening 42 into which a projection of the spring arm 32, 33 respectively is hung which is constructed, for example, as a hook 43. The opening 42 or openings may in each case be provided with an eye for reinforcement purposes.

As illustrated in FIG. 2, the base 25 of the carrier 24 has two molded parts 44, 45 which are fastened to one another and which receive the first long side 27 of the flat structure 26 between one another. The flat structure 26 consists, for example, of two layers 46, 47, is held on the base 25. As also shown in FIG. 2, a reinforcing element 48 may be threaded between the two layers 46, 47 to prevent that the flat structure slides out from between the two molded parts 44, 45. The molded part 45 is connected with the interior side 16 of the tailgate 7, and the molded part 44 forms particularly a covering or paneling for the molded part 45.

A corresponding fastening device is provided on the base 25 for a releasable fastening of the view blocking device 22 on the interior side 16 of the tailgate 7. This fastening device, for example, includes pins 50, 51 respectively which penetrate the base 25 and engage in or engage behind corresponding parts 52 covering the interior side, and thereby hold the base 25 on this covering part 52. The pins 50, 51 can preferably be rotated by a corresponding operating device 53, whereby the fastening on the interior side 16 can optionally be released or locked.

What is claimed is:

1. View blocking element for a vehicle luggage compartment, comprising a carrier and a flexible flat structure operatively and mountable held on the carrier wherein the carrier comprises a base from which, at least by way of a first end thereof, at least one spring arm of a tensioning device for the flexible flat structure starts out, and the at last one spring arm is connected with the flexible flat structure at a distance from the first end, wherein the flexible flat structure is fasten able with a first long side thereof to the base, and the at least one spring arm has a hook opening situated adjacent to a second long side thereof.

2. View blocking element according to claim 1, wherein the at one spring arm has a second end and is connected therewith by the flexible flat structure.

3. View blocking element according to claim 1, wherein the at least one spring arm is releasable connected with the flexible flat structure.

4. View blocking element according to claim 3, wherein the at least one spring arm ha s second end and is connected therewith by the flexible flat structure.

5. View blocking element according to claim 1, wherein the at least one spring arm is hung via a hook movable into an opening, at the flexible flat structure.

6. View blocking element according to claim 1, wherein the base is releasable fasten able to a vehicle tailgate configured to close the vehicle luggage compartment.

7. View blocking element according to claim 1, wherein the flexible flat structure comprises a fabric web.

8. View blocking element according to claim 1, wherein the hook opening is at a corner between the second long side and a narrow side of the flexible flat structure.

9. View blocking element according to claim 1, wherein the base comprises two molded parts, and a first long side of the flexible flat structure is holdingly received between the molded parts.

10. View blocking element for a vehicle luggage compartment, comprising a carrier and a flexible flat structure operatively and mountable held on the carrier wherein the carrier comprises a base from which, at least by way of a first end thereof, at least one spring arm of a tensioning device for the flexible flat structure starts out, and the at last one spring arm is connected with the flexible flat structure at a distance from the first end, wherein the tensioning device comprises two spring arms which, starting out from a first end thereof at the base, extend away from one another.

11. View blocking element according to claim 10, wherein the spring arms start out approximately centrally from the base.

12. Tailgate for a vehicle which selectively closes or opens up a luggage compartment, comprising a view blocking element according to claim 1.

13. Tailgate according to claim 12, wherein the tailgate has a rear window insert able into a frame.

14. Tailgate for a vehicle luggage compartment, comprising a carrier and a flexible flat structure operatively and mountable held on the carrier wherein the carrier comprises a base from which, at least by way of a first end thereof, at least one spring arm of a tensioning device for the flexible flat structure starts out, and the at last one spring arm is connected with the flexible flat structure at a distance from the first end, wherein the tailgate has a rear window insert able into a frame, and the frame has a non-transparent flat frame section.

15. Tailgate according to claim 12, wherein the view blocking element is fasten able approximately in a transition section between a rear window and the flat frame section to an interior side of the tailgate.

16. Tailgate according to claim 12, wherein the base is fasten able to an interior side of the tailgate.

17. Tailgate according to claim 16, wherein the base is releasable.

18. Tailgate according to claim 12, wherein the view blocking element is substantially fixedly fastened to an interior side of the tailgate.

* * * * *